(12) United States Patent
Vogel

(10) Patent No.: US 9,541,138 B2
(45) Date of Patent: Jan. 10, 2017

(54) CLUTCH DEVICE

(71) Applicant: Schaeffler Technologies AG & Co. KG, Herzogenaurach (DE)

(72) Inventor: Florian Vogel, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/648,318

(22) PCT Filed: Dec. 12, 2013

(86) PCT No.: PCT/DE2013/200360
§ 371 (c)(1),
(2) Date: May 29, 2015

(87) PCT Pub. No.: WO2014/094769
PCT Pub. Date: Jun. 26, 2014

(65) Prior Publication Data
US 2015/0308512 A1    Oct. 29, 2015

(30) Foreign Application Priority Data
Dec. 20, 2012    (DE) .................. 10 2012 223 959

(51) Int. Cl.
*F16D 13/64* (2006.01)
*F16D 13/68* (2006.01)
(Continued)

(52) U.S. Cl.
CPC ........... *F16D 13/644* (2013.01); *F16D 13/683* (2013.01); *F16D 27/08* (2013.01); *F16D 2023/123* (2013.01); *F16D 2300/22* (2013.01)

(58) Field of Classification Search
CPC ..................................................... F16D 13/644
See application file for complete search history.

(56) References Cited

U.S. PATENT DOCUMENTS 4,257,510 A * 3/1981 Fisher ................ F16F 15/1215
                                                          192/207
4,592,460 A    6/1986 Kittel et al.
(Continued)

FOREIGN PATENT DOCUMENTS

CN    102549287      7/2012
DE    10 2010 017870    11/2010
(Continued)

*Primary Examiner* — Mark Manley
(74) *Attorney, Agent, or Firm* — Davidson, Davidson & Kappel, LLC

(57) ABSTRACT

A clutch device, in particular a booster clutch device, including at least a clutch flange and a clutch hub, which are arranged coaxially to each other and are coupled with each other by means of a spring device having a multi-stage spring characteristic is provided. The clutch flange forms a plate basket to hold lamellae for a clutch.

The clutch device shown and described here is less complex than corresponding clutch devices which are assumed to be known, functions of the plate basket and the torque sensor being combined. That makes fewer parts necessary, but they continue to have the same functions. The construction is less complex, assembly requires less effort, and the costs are reduced accordingly. The clutch device is flexibly adaptable to different requirements.

10 Claims, 5 Drawing Sheets

(51) Int. Cl.
F16D 27/08 (2006.01)
F16D 23/12 (2006.01)

(56) References Cited

U.S. PATENT DOCUMENTS

| | | | |
|---|---|---|---|
| 4,645,054 | A | 2/1987 | Raab |
| 6,247,570 | B1 | 6/2001 | Zindler |
| 8,474,585 | B2 * | 7/2013 | Chambrion ............. F16D 23/12 192/35 |
| 2007/0119679 | A1 * | 5/2007 | Fukuda ................ F16D 13/385 192/70.17 |
| 2012/0241277 | A1 | 9/2012 | Chambrion et al. |
| 2012/0247914 | A1 | 10/2012 | Chambriion et al. |

FOREIGN PATENT DOCUMENTS

| | | |
|---|---|---|
| DE | 10 2010 048827 | 5/2011 |
| DE | 10 2010 048828 | 5/2011 |
| KR | 100981840 | 9/2010 |
| WO | WO 2013/186101 | 12/2013 |

* cited by examiner

CLUTCH DEVICE

The invention relates to a clutch device of a motor vehicle, in particular a booster clutch.

To significantly lower the actuating forces for a clutch, new steps must be taken. One option is to employ what is known as a booster clutch. This clutch system has a pilot clutch and a main clutch. The two elements here are connected by a ramp system using rolling elements. When the pilot clutch is engaged, the ramps of the ramp system are rotated by the built-up torque, and thus the main clutch is engaged. The necessary energy to actuate the main clutch is supplied in this system by the motor, and only the force to engage the pilot clutch needs to be provided from outside.

BACKGROUND

A central component of such a booster clutch device is a so-called torque sensor. The booster clutch device has a pilot clutch and a main clutch. In particular, a motor and a transmission are provided, which are connected or coupled by the booster clutch device. The pilot clutch and the main clutch are connected to each other by the ramp system referred to above. A transmissible torque from the motor to the transmission corresponds to a main clutch contact force. The main clutch contact force corresponds to an axial movement of a contact plate (plates of the main clutch). An axial movement corresponds in turn to a rotation of a ramp around an angle. A transmissible torque therefore corresponds to a rotation of the ramp around an angle. The relationship between torque and angle can be depicted by a ramp torque characteristic.

The torque sensor can be envisioned as a torsion spring device, which is situated in particular between the transmission and the main clutch. If a load alteration now occurs, then the transmitted torque in the drivetrain changes, which in turn changes the tension of the torsion spring device. To avoid jamming of the ramp system under such load alterations, the spring characteristic of the torsion spring device must be adjusted accordingly, and must correspond as closely as possible to the ramp torque characteristic. This makes it possible to ensure than when the load changes, the changing torque to be transmitted can then be transmitted reliably by adjusting the contact force of the main clutch. A torque sensor inserted into a drivetrain makes it possible for a rotation to be caused when such a variation of torques occurs under a load alteration, where the torsion spring angle that occurs corresponds to a torque. If the torsional spring stiffness is too low, then the torsional spring device can rotate too severely, so that one of the ramps assumes a position in which the contact force is too low compared to the torque to be transmitted. But if the torsional spring stiffness is greater than the ramp torque stiffness, the ramp may remain jammed.

Such clutch devices or booster clutches having torque sensors are known, but they are highly complex, and are correspondingly demanding in terms of manufacture and installation. Furthermore, these clutch devices have numerous individual parts, each of which requires expensive processing in order to guarantee the functioning of the clutch device.

SUMMARY OF THE INVENTION

It is an object of the present invention to provide a clutch device, in particular a booster clutch device, comprising at least a clutch flange and a clutch hub, which are arranged coaxially to each other and are coupled with each other by means of a spring device having a multi-stage spring characteristic. The clutch flange forms a plate basket to hold lamellae for a clutch.

It should be pointed out in this connection that lamellae are always referred to below as transmission means between the plate basket and the clutch. However, single-plate or multi-plate systems may be employed equally well as an alternative to the lamellae.

As explained earlier, booster clutches are single-plate or multi-plate or lamellar clutches, which produce the contact force to produce a transmissible torque from a motor, for example, on a transmission, with the aid of a ramp system. A torque sensor is employed here, which is used to sense the torque present in the clutch. It ensures that always only the torque to be transmitted is present in the booster clutch. It is also responsible for ensuring that the booster clutch can be opened again and that the drivetrain and the ramps do not seize up or jam. Such a torque sensor is usually inserted between a transmission and the main clutch, where the main clutch carries the aforementioned lamellae. Within the framework of the present invention, it is now proposed that the function of the torque sensor and parts of the clutch be combined with each other in a few components.

Corresponding torque sensors are known from the prior art, in which a torque sensor is made from the clutch hub and the clutch flange, which are coupled with each other by means of a spring device. Such torque sensors are situated between the plate basket and the transmission. Here for the first time, the functions of these components plate basket and torque sensor are combined with each other. Components can be saved thereby, and the complexity of the clutch device can be reduced significantly. This makes it possible to produce an economical and sturdy clutch system, which is especially well suited for use in motor vehicles, for example passenger cars, trucks and motorcycles. In particular, internal combustion engines, but also electric motors, may be used as motors, while the present clutch device can be used for all types of clutches (for example manual shifting, automatic, "e-clutch," . . . ).

In particular, the one plate or the plurality of plates, or the lamellae of the clutch, is/are connected directly to the clutch flange, so that no additional components are necessary to transmit torque between the plates or lamellae and the clutch flange.

According to an advantageous embodiment, the clutch flange surrounds the clutch hub, seen in a radial direction, outside of both sides of the clutch hub, and there forms a first receptacle for the lamellae.

In particular, the clutch flange is designed in two pieces, each piece of the two-piece clutch flange being situated on one side of the clutch hub.

According to another especially advantageous embodiment, the clutch hub has at least one second receptacle for at least one leaf spring, the at least one leaf spring being fixed by the clutch hub itself, in particular by clamping. In particular, a plurality of leaf springs may also be fixed in the at least one second receptacle. In particular, seen in a circumferential direction, there are additionally a plurality of second receptacles provided in the clutch hub, with at least one leaf spring situation in each of which. The leaf springs act as springs together with corresponding stops on the clutch flange, and so form a spring device.

In particular, there are in addition other springs, particularly torsion springs, situated in additional third receptacles, which are likewise coupled with additional stops on the clutch flange and work together in a circumferential direction as a spring device.

The springs of the spring device, interacting as a result of their special arrangement, bring about a multi-stage spring characteristic. This spring characteristic will be explained in greater detail in conjunction with the figures.

In particular, the at least one second receptacle has a first stop, by which the at least one leaf spring is fixed in a radial direction toward the outside. This first stop enables, among other things, secure installation of the at least one leaf spring, since the first stop fixes the position of the at least one leaf spring in a radial direction.

In particular, the clutch flange has, at least on one side of the clutch hub, a second stop, by which the at least one leaf spring is fixed in at least one axial direction.

In particular, it is proposed that the leaf spring is fixed by the clutch hub in a position in the circumferential direction in the second receptacle. In particular, the at least one leaf spring is additionally fixed by a first stop in a radial direction toward the outside, so that the position is therefore also fixable in the radial direction. So it is now also proposed in particular that a second stop be provided by the clutch flange, by which the at least one leaf spring is also fixed in the axial direction, so that the arrangement of the at least one leaf spring is completely fixed thereby in the clutch hub or in the clutch device.

It is especially advantageous if the clutch flange also extends over the second side of the clutch hub and provides an additional second stop there, so that the at least one leaf spring is also fixed in the other axial direction. Accordingly, the leaf spring is then completely fixed on both sides of the clutch hub in the axial direction by the clutch flange.

It is especially preferred that the at least one leaf spring extend in a radial direction and be fixed in an outer first section by the clutch hub, and be coupled with a second section located further inward with the clutch flange, as a spring device.

In particular, the at least one leaf spring has a region in the inner second section which projects, at least in one axial direction, over the second receptacle of the clutch hub, the region being coupled with a third stop of the clutch flange in a circumferential direction as a spring device.

According to an especially advantageous embodiment of the clutch device, the clutch flange is situated so that it is rotatable relative to the clutch hub in both circumferential directions, and the clutch flange has a plurality of stops acting in both circumferential directions, which are each coupled with springs that are situated in the clutch hub. These stops and springs work together as a spring device in both circumferential directions. The successive interaction of springs and stops can be illustrated by a spring characteristic. In particular, the stops acting in the one circumferential direction are designed differently compared to the stops acting in the other circumferential direction, so that the spring device acts differently in different circumferential directions; that is, in particular it has a different spring characteristic.

According to another advantageous embodiment of the clutch device, the clutch hub has two sides, each pointing in an axial direction, which are designed identically to each other. The assembly of the clutch device can be further simplified by means of this especially advantageous embodiment, since the construction of the clutch device can be undertaken independently of the orientation of the clutch hub.

The features listed individually in the patent claims can be combined with each other in any technologically reasonable way, and can be supplemented by explanatory facts from the description and details from the figures, in which case additional variant embodiments of the invention will be shown.

BRIEF DESCRIPTION OF THE DRAWINGS

The invention as well as the technical environment will be explained in greater detail below on the basis of the figures. The figures show especially preferred exemplary embodiments, to which the invention is not limited however. In particular, it must be pointed out that the figures, and especially the depicted size proportions, are only schematic. Identical reference labels in the figures designate identical objects. The figures show the following.

DETAILED DESCRIPTION

Figure 1:
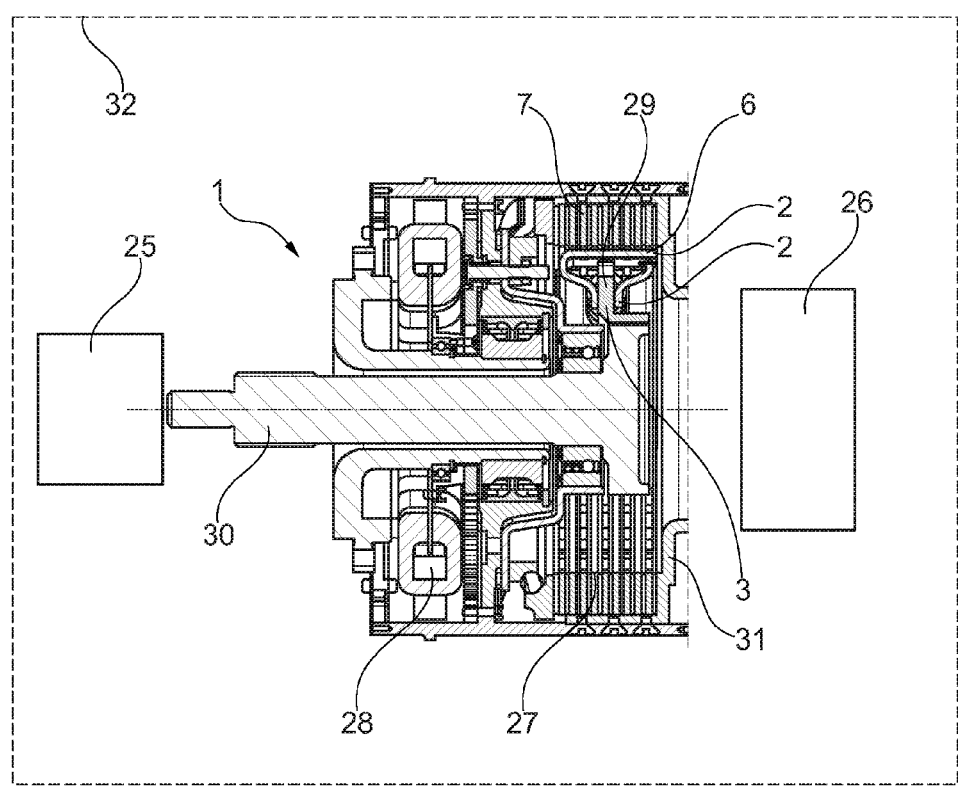
FIG. 1: a clutch device in a motor vehicle.

FIG. 1 shows a clutch device 1 in a motor vehicle 32. The clutch device 1 is connected to a motor 25 by means of a drive shaft 30, and to a transmission 26 by means of an output shaft 31. The clutch device 1 thus connects the motor 25 and the transmission 26 of the motor vehicle 32 in order to transmit torque. The clutch device 1 has a pilot clutch 28 and a main clutch 27. The main clutch 27 has lamellae 7, which, when frictionally engaged with each other, transmit a torque from the motor 25 to the output shaft 31. Also situated inside the main clutch 27 is a torque sensor 29. In the depiction shown here, the upper part of the main clutch 27 is shown in cutaway view, so that the torque sensor 29 is visible there. This torque sensor 29 includes a clutch flange 2 and a clutch hub 3. The present invention is now directed at the particular form of the torque sensor 29, and (particularly) at its incorporation into the main clutch 27. The following FIGS. 2-5 show especially preferred variant embodiments of the invention.

Figure 2:
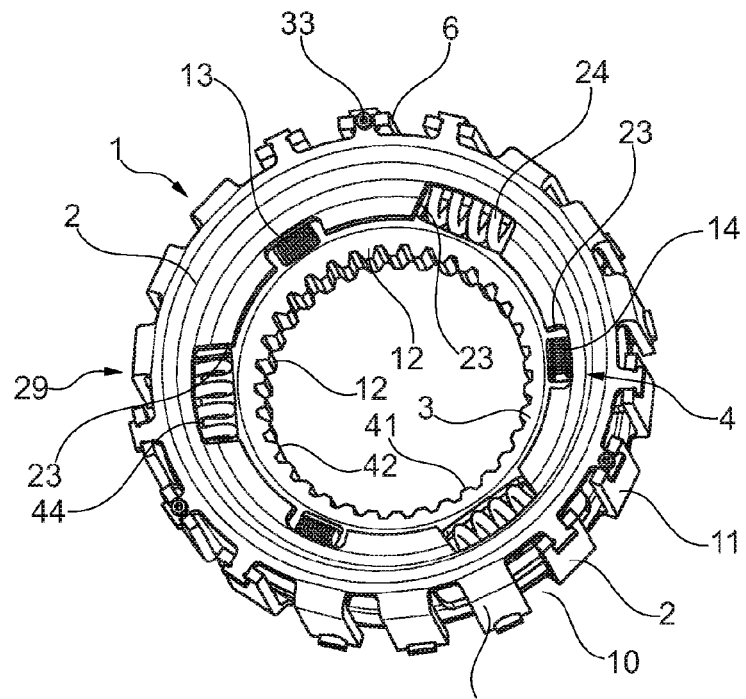
FIG. 2: a clutch device, consisting of a clutch flange and clutch hub, in perspective view.

FIG. 2 shows the clutch device 1, consisting of clutch flange 2 and clutch hub 3, in perspective view. The clutch hub 3 is designed in the area of the internal circumferential surface 42 with spline teeth 41, by means of which a positive connection with the drive shaft 30 (not shown here) can be produced. The clutch hub 3 has a first side 12 and a second side 12 (here behind the drawing plane). In addition, the clutch hub 3 has second receptacles 13 for leaf springs 14 and third receptacles 44 for springs 24 (here torsion springs). The clutch hub 3 is surrounded radially on the outside by a two-piece clutch flange 2. The two pieces 11 of the clutch flange 2 are connected to each other in the axial direction by fastening elements 33. In addition, the clutch flange 2 has stops 23, which work together with the leaf springs 14 or springs 24 as a spring device 4. The clutch flange 2 also forms a plate basket 6, which is meshed with the lamellae 7 of the main clutch 27 (not shown here). So the lamellae 7 of the main clutch 27 are situated at the plate basket 6 of the clutch flange 2, and are driven by the latter to transmit torque. The lamellae 7 (not shown here) are situated in first receptacles 10 of the plate basket 6. The clutch device 1 thus forms a torque sensor 29, with the function of the plate basket 6 having been integrated directly into the clutch flange 2.

Figure 3:
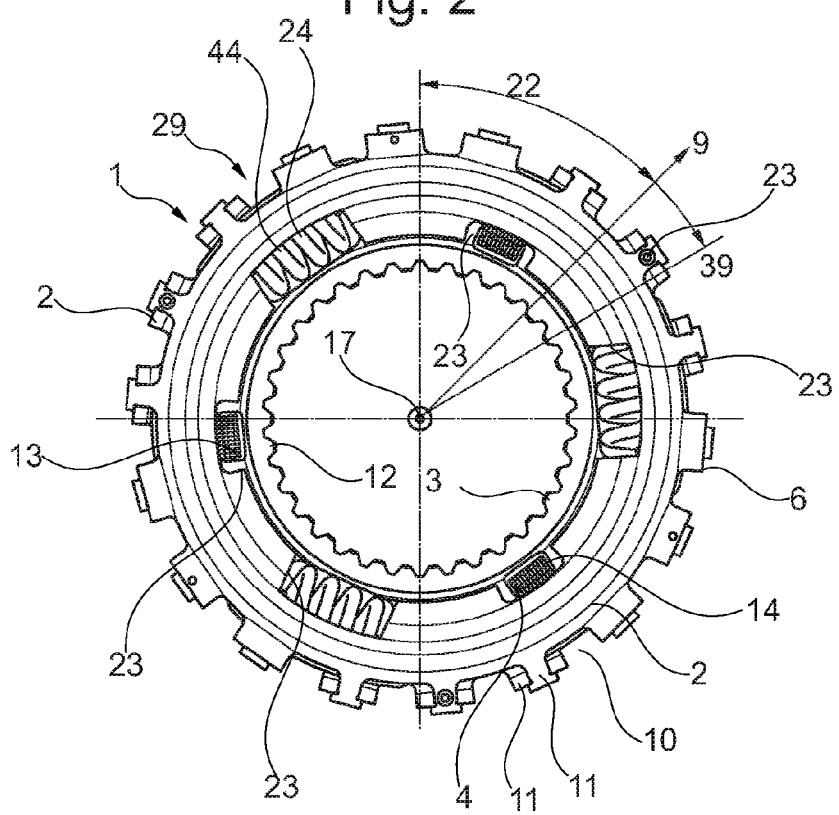
FIG. 3: a clutch device, consisting of a clutch flange and clutch hub, in side view.
Figure 6:
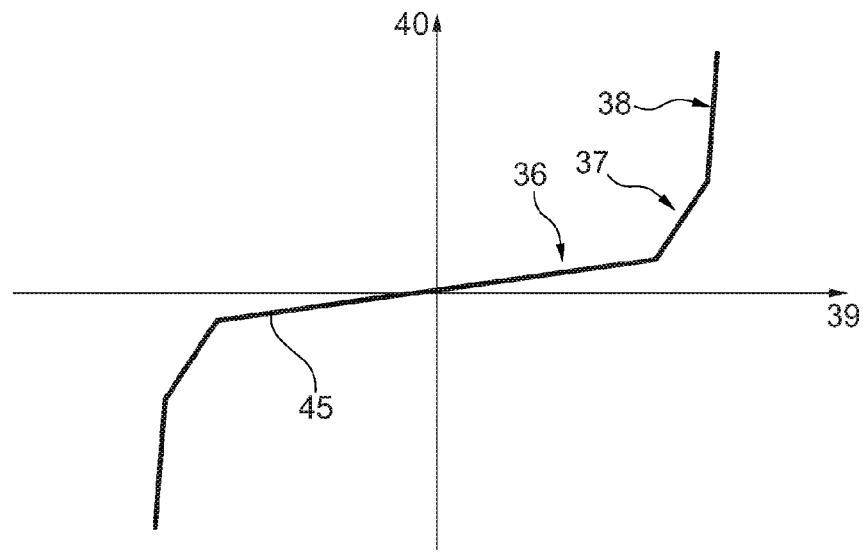
FIG. 6: a spring characteristic.

FIG. 3 shows a clutch device 1 having a clutch flange 2 and clutch hub 3, in side view. The clutch flange 2 is formed by two pieces 11, which surround the clutch hub 3 outside, seen in a radial direction 9. The clutch flange 2 has on its outer circumferential surface first receptacles 10, which are provided to engage with lamellae 7 (not shown here) of the main clutch 27. The clutch hub 3 has second receptacles 13, in which leaf springs 14 are situated, and third receptacles 44, in which springs 24 are situated. The springs 24 and leaf springs 14 are coupled with stops 23, so that a spring device 4 is formed between clutch flange 2, clutch hub 3, springs 14, 24 and stops 23. Accordingly, the clutch flange 2 can be rotated in relation to the clutch hub 3 in each circumferential direction 22 by an angle 39, so that the stops 23 become engaged successively, in particular at first with the spring 24 (here a torsion spring) and subsequently with the leaf spring 14. Through this successive interaction of the stops 23 with the springs 14, 24, a torque is applied to the springs 14, 24. These springs 14, 24 together form the required stiffness of the desired spring characteristic 45 (the spring characteristic is depicted in FIG. 6). Through the successive interaction of the stops 23 with the springs 14, 24, a multi-stage spring characteristic 45 can be produced. Clutch flange 2, clutch hub 3, springs 14, 24 and stops 23 form the torque sensor 29. In addition, the clutch flange 2 is designed as a plate basket 6, so that altogether a clutch device 1 is realized in which the functions of plate basket 6 and torque sensor 29 are combined with each other.

Figure 4:
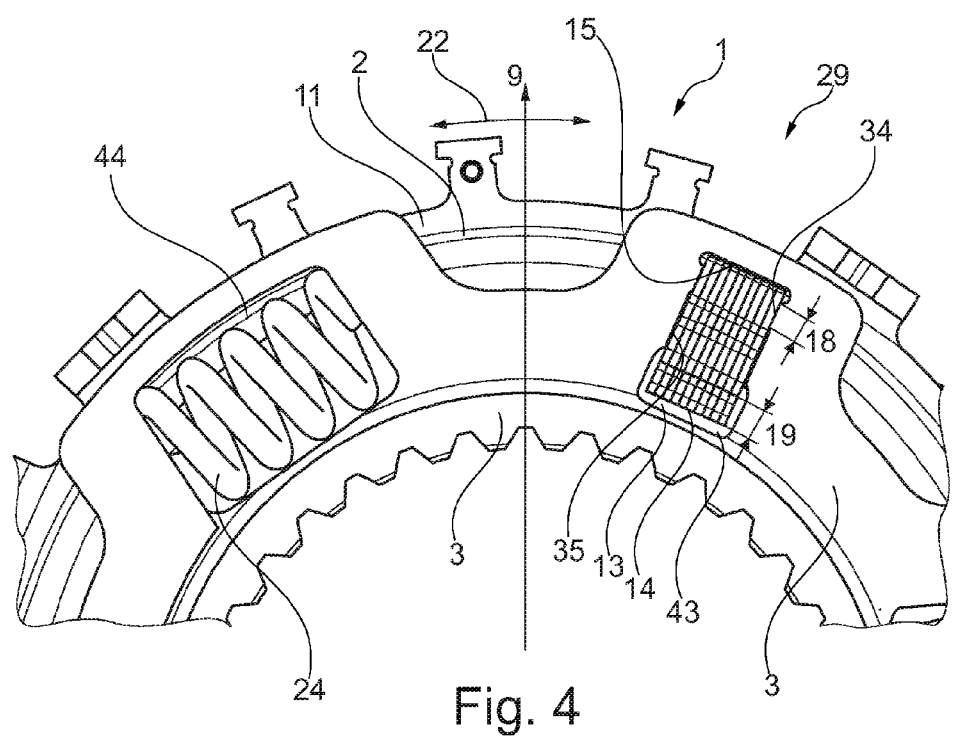
FIG. 4: a detail from FIG. 3, partially cut away.

FIG. 4 shows a detail of the clutch device 1 according to FIG. 3 in side view, with the front piece 11 of the clutch flange 2 having been cut away here. The clutch hub 3 has second receptacles 13, in which leaf springs 14 are situated, and third receptacles 44, in which springs 24 are situated. Also shown in the detail is the clutch flange 2, which is situated behind the clutch hub 3. The front piece 11 of the clutch flange 2 is cut away here, so that the clutch hub 3 is visible with the second receptacle 13 and the third receptacle 44. The leaf springs 14 are inserted into the second receptacle 13, and fixed in the radial direction 9 toward the outside by a first stop 15. This fixes the position of the leaf springs 14 in radial direction 9 toward the outside. Furthermore, in a first section 18, the leaf springs 14 are clamped in a fixing element 34 in the circumferential direction 22, so that the leaf springs 14 are now also fixed in their position in the circumferential direction 22. Starting from the first stop 15, the leaf springs 14 extend inward in radial direction 9 along a contour 35 of the second receptacle 13. The leaf springs 14 extend beyond the contour 35 of the second receptacle 13, and form a second section 19. When the leaf springs 14 contact a stop 23 (not shown here) of the clutch flange 2, the leaf springs 14 are deflected in the circumferential direction 22. Here the leaf springs 14 first contact the contour 35, the second stage 37 of the spring characteristic 45 being realized starting from the depicted starting position until the contact with the contour 35. The first stage 36 of the spring characteristic denotes the state of the clutch device 1 when the stop 23 of the clutch flange 2 contacts and compresses the spring 24 in the third receptacle 44. The third stage 38 of the spring characteristic 45 is formed starting from the point at which the leaf springs 14 are in contact with the contour 35 in the second receptacle 13, and the leaf springs 14 now continue to be subjected to a torque beyond that point.

It should be pointed out that the stages 36, 37, 38 of the spring characteristic 45 can be changed in a simple manner, for example by adjusting the contour 35. FOR EXAMPLE, the contour 35 may be situated farther away from the starting position of the leaf springs 14 in the circumferential direction 22, so that greater bending of the leaf springs 14 is necessary before they make contact with the contour 35. Furthermore, the contour 35 may also be retracted further to the outside in radial direction 9, so that the contacting of the contour 35 occurs later.

Figure 5:
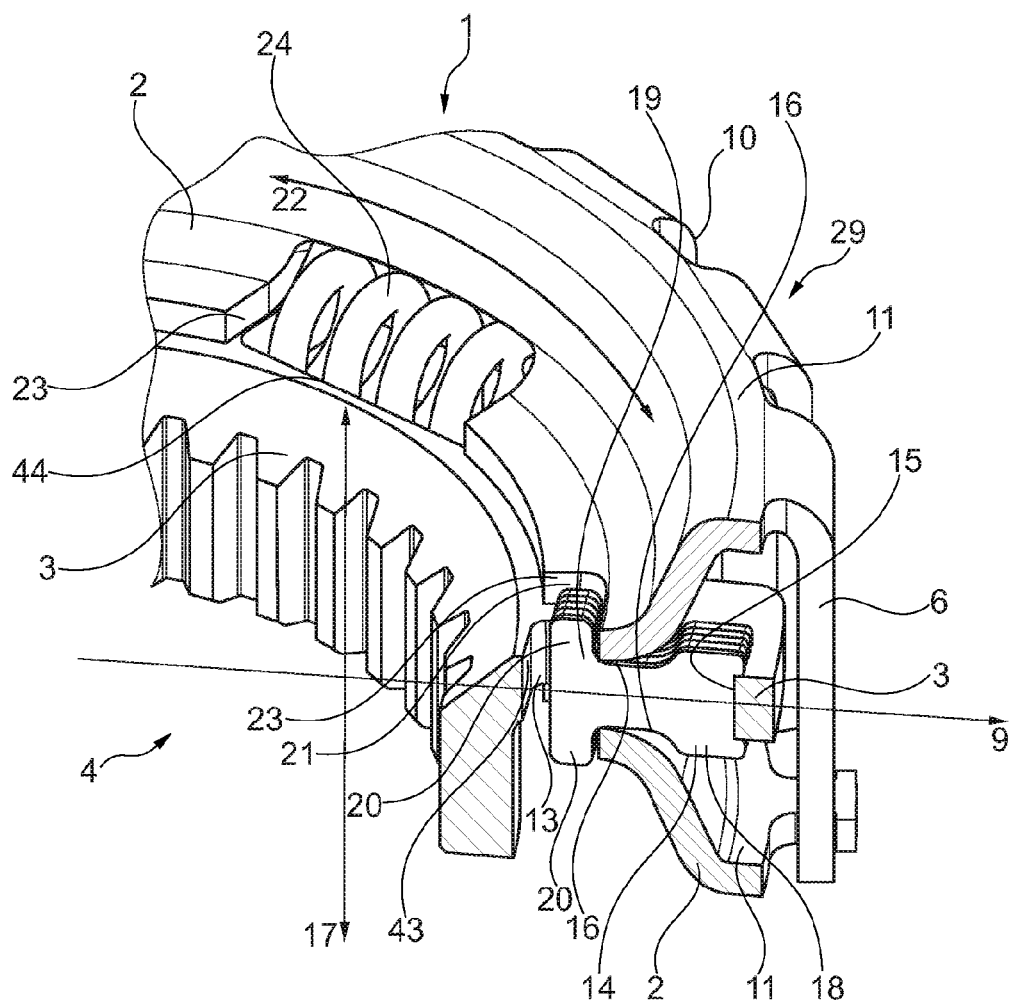
FIG. 5: a detail of the clutch device in perspective view and partially cut away.

FIG. 5 shows an additional detail of the clutch device 1 in perspective view and partially cut away. The clutch hub 3 is surrounded to the outside in a radial direction 9 by two parts 11 of the clutch flange 2, the clutch flange 2 forming a plate basket 6 having first receptacles 10, radially outside of the clutch hub 3. The clutch hub 3 has a second receptacle 13 (depicted in cutaway view here), in which leaf springs 14 are situated. The leaf springs 14 contact a first stop 15 toward the outside in a radial direction 9. Toward the inside in a radial direction 9, a gap 43 is provided between the second receptacle 13 and the leaf springs 14. The installation of the leaf springs 14 in the second receptacle 13 is simplified in particular by this gap 43. Furthermore, both pieces 11 of the clutch flange 2 contact the leaf springs 14 on both sides with a second stop 16 each, and thus enable fixing of the leaf springs 14 in the axial direction 17. The leaf springs 14 have a first section 18, radially toward the outside, in which they are fixed or clamped in circumferential direction 22 by the second receptacle 13 of the clutch hub 3 (see fixing element 34 in FIG. 4). In addition, the leaf springs 14 have a second stop 19 radially toward the inside, in which the leaf springs 14 work together with stops 23 (here third stop 21) of the clutch flange 2 as spring device 4. A preferred form of the leaf springs 14 is shown here. In the area of the second section 19, the leaf springs 14 each have a region 20 which projects beyond the clutch hub 3 in axial direction 17 in the area of the second receptacle 13. Thus an interaction with a third stop 21 of the clutch flange 2 is possible in an especially simple manner. The stop 21 deflects the leaf springs 21 in a circumferential direction 22. As already shown in FIG. 4, the leaf springs 14 are thus first pressed against a contour 35 (not shown here), and successively bent further with the second section 19 as the torque increases.

It is also evident here that with increasing rotation of the clutch flange 2 in relation to the clutch hub 3 in the circumferential direction 22, successive engagement of stops 23, and in particular of third stops 21, with springs 24 and leaf springs 14 can be achieved. These different engagements together form the spring device 4, so that a torque sensor 29 is realized.

Let it be noted here that usually a symmetrical arrangement of stops 23 and third stops 21 opposite the springs 24 and leaf springs 14 in both circumferential directions 22 is provided. Nevertheless, in a preferred form these stops 23 and 21 may be modified, jointly or individually, and only in one direction of rotation, compared to the other direction of rotation, in such a way that different spring characteristics are realized depending on the direction of rotation. Accordingly, different spring characteristics 45 are realizable for increases and decreases of the torque of the motor 25.

FIG. 6 shows a spring characteristic 45 of the torque sensor 29. The angle 39 is plotted here on a horizontal axis, and the torque 40 on the vertical axis. The course of a multi-stage spring characteristic 45 is recognizable. The spring characteristic 45 has a first stage 36 in the vicinity of the zero point, followed by a second stage 37 and then a third stage 38. The course of this spring characteristic can be changed by different arrangements of the stops 23 or third stops 21 (see the comments above on the other figures). Similarly, other springs having different stiffnesses may of course also be employed. Likewise, the positions of the stops 21, 23, and also for example the layout of the contour 35 may be changed for one direction of rotation of the clutch flange 2 in relation to the clutch hub 3. In this case, non-symmetrical patterns of the spring characteristic 45 (in reference to the point of intersection of the diagram shown here) can also be realized.

Figure 7:
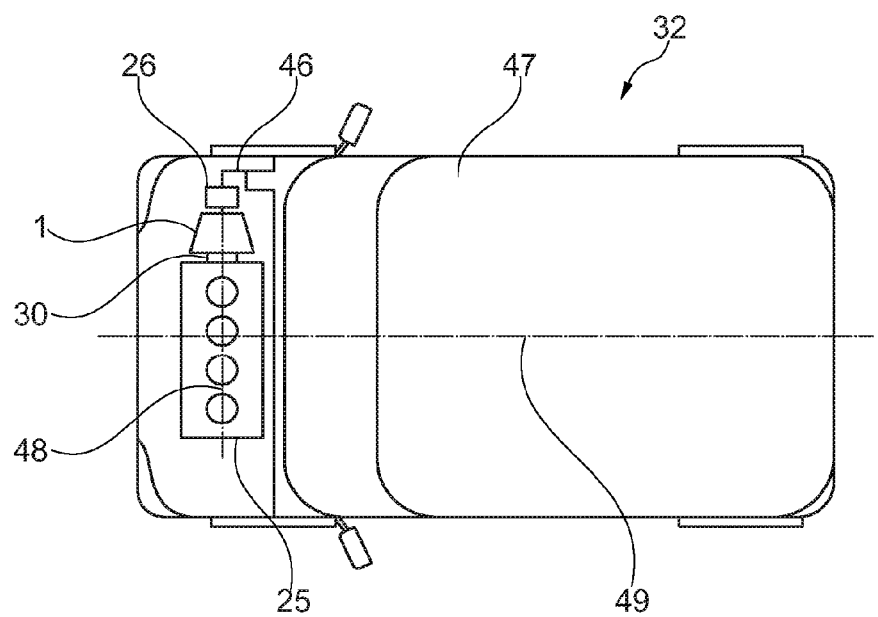
FIG. 7: a motor vehicle.

FIG. 7 shows a motor vehicle 32 having a motor 25, in particular an internal combustion engine, which drives a drive shaft 30. The drive shaft 30 is connected to an output shaft 31 by means of a clutch device 1. The output shaft 31 is connected here to a transmission 26, which enables transmission of torque to a drivetrain 46 of the motor vehicle 32. The motor 25 is constructed ahead of a driver's compartment 47. The drive shaft 30 and the output shaft 31 rotate around the axis of rotation 48, which is oriented transversely to a longitudinal axis 49 of the motor vehicle 32.

The clutch device 1 shown and described here is less complex than corresponding clutch devices which are assumed to be known, functions of the plate basket 6 and the torque sensor 29 being combined. This requires fewer parts, but they continue to have the same functions. The construction is less complex, assembly requires less effort, and the costs are reduced accordingly. The clutch device 1 is flexibly adaptable to different requirements.

REFERENCE LABELS 1 clutch system
2 clutch flange
3 clutch hub
4 spring device
5 spring characteristic
6 plate basket
7 lamellae
8 clutch
9 radial direction
10 first receptacle
11 piece
12 side
13 second receptacle
14 leaf spring
15 first stop
16 second stop
17 axial direction
18 first section
19 second section
20 region
21 third stop
22 circumferential direction
23 stop
24 spring
25 motor
26 transmission
27 main clutch
28 pilot clutch
29 torque sensor
30 drive shaft
31 output shaft
32 motor vehicle
33 fastening element
34 fixing element
35 contour
36 first stage
37 second stage
38 third stage
39 angle (degrees)
40 torque (Nm)
41 spline toothing
42 internal circumferential surface
43 gap
44 third receptacle
45 spring characteristic
46 drivetrain
47 driver's compartment
48 axis of rotation
49 longitudinal axis

What is claimed is:

1. A clutch device comprising: at least a clutch flange and a clutch hub arranged coaxially to each other and coupled with each other via a spring device having a multi-stage spring characteristic, the clutch flange forming a plate basket to hold lamellae for a clutch, the clutch hub having at least one spring receptacle for at least one leaf spring, the at least one leaf spring extending in a radial direction and fixed in an outer first section by the clutch hub, and coupled with the clutch flange with a second section located further inward, as at least part of spring device.

2. The clutch device as recited in claim 1 wherein the clutch flange surrounds the clutch hub, seen in a radial direction, outside of both sides of the clutch hub, and there forms at least one first receptacle for the lamellae.

3. The clutch device as recited in claim 1 wherein the clutch flange is designed in two pieces, and each piece of the clutch flange is situated on one side of the clutch hub.

4. The clutch device as recited in claim 1 the at least one leaf spring being fixed by the clutch hub itself via clamping.

5. The clutch device as recited in claim 1 wherein the spring receptacle has a first stop, the at least one leaf spring being fixed by the first stop in a radial direction toward the outside.

6. The clutch device as recited in claim 1 wherein the clutch flange has, at least on one side of the clutch hub, a second stop, the at least one leaf spring being fixed by the second stop in at least one axial direction.

7. The clutch device as recited in claim 1 wherein the at least one leaf spring has a region in the inner second section, the region projecting, at least in one axial direction, over the spring receptacle of the clutch hub, the region being coupled with a third stop of the clutch flange in a circumferential direction as at least part of the spring device.

8. The clutch device as recited in claim 1 wherein the clutch flange is rotatable relative to the clutch hub in both circumferential directions, and the clutch flange has a plurality of stops acting in both circumferential directions, the stops are each coupled with springs situated in the clutch hub, so that stops and springs work together as a spring device in both circumferential directions, the stops acting in the one circumferential direction being designed differently compared to the stops acting in the other circumferential direction, so that the spring device acts differently in different circumferential directions.

9. The clutch device as recited in claim 1 wherein the clutch hub has two sides pointing in an axial direction, and the sides are designed identically.

10. A booster clutch device comprising the clutch device as recited in claim 1.

* * * * *